United States Patent [19]

Bucknell et al.

[11] 4,117,858
[45] * Oct. 3, 1978

[54] FLAPPER TYPE SPOUT ASSEMBLY

[75] Inventors: Ernest H. Bucknell, Los Angeles; Jack K. Rauh, Hacienda Heights, both of Calif.

[73] Assignee: TRE Corporation, Beverly Hills, Calif.

[*] Notice: The portion of the term of this patent subsequent to Dec. 3, 1991, has been disclaimed.

[21] Appl. No.: 193,399

[22] Filed: Oct. 28, 1971

[51] Int. Cl.² ............................................. F16K 31/44
[52] U.S. Cl. .................................. 137/119; 137/359; 137/467
[58] Field of Search .................... 137/119, 467, 801

[56] References Cited

U.S. PATENT DOCUMENTS

| 2,968,313 | 1/1961 | Camp | 137/467 |
|---|---|---|---|
| 2,997,058 | 8/1961 | Hall | 137/467 X |
| 3,012,251 | 12/1961 | Fife | 137/467 X |
| 3,473,558 | 10/1969 | Mongerson | 137/119 X |
| 3,576,197 | 4/1971 | Bastian | 137/467 X |
| 3,739,806 | 6/1973 | Bucknell | 137/467 X |

Primary Examiner—Robert G. Nilson
Attorney, Agent, or Firm—Spensely, Horn & Lubitz

[57] ABSTRACT

There are disclosed herein spout assemblies, such as tub spouts or the like, for use in a fluid system employing a diverter valve and a shower head or the like. Most of the parts of the assemblies may be made of plastic, and include a spout body having inlet and outlet chambers and a partition with an aperture therethrough separating the two chambers. A lift button has a stem extending into the outlet chamber, and the stem is coupled with a flapper or gate mounted at the upstream side of the aperture in the partition for terminating the flow of water through the spout assembly to thereby cause diverter valve opertion, and flow through a shower head or the like in a conventional manner. In one embodiment, the stem is coupled with a spring biased nozzle in the outlet chamber, the nozzle being coupled with the flapper. In another embodiment, a spring is coupled with the flapper to bias it toward an open position. An adapter may be included within the inlet chamber of the body for enabling the spout assembly to be coupled with plumbing systems utilizing different sizes of outlet pipes.

5 Claims, 10 Drawing Figures

FLAPPER TYPE SPOUT ASSEMBLY

This invention relates to water spout assemblies, and the like, and relates more particularly to an improved diverter spout assembly.

Various types of diverter spout assemblies have been devised, examples being found in U.S. Pat. Nos. 3,086,748; 3,473,558; and 3,419,914. Many prior spout assemblies have been characterized by relatively complex and costly construction, unsuitable operation over a period of time in providing a proper sealing action during operation thereof, costly fabrication, difficulty of assembly or repair, or the like.

Accordingly, it is an object of this invention to provide an improved spout assembly.

Another object of this invention is to provide a new spout assembly wherein the principal parts thereof may be formed of plastic.

A further object of this invention is to provide a new diverter spout assembly employing a novel combination of a flapper or gate, biasing means, and means for moving the flapper for selectively terminating flow of fluid through the assembly.

These and other objects and features of the present invention will become better understood through a consideration of the following description taken in conjunction with the drawings in which.

Figure 1:
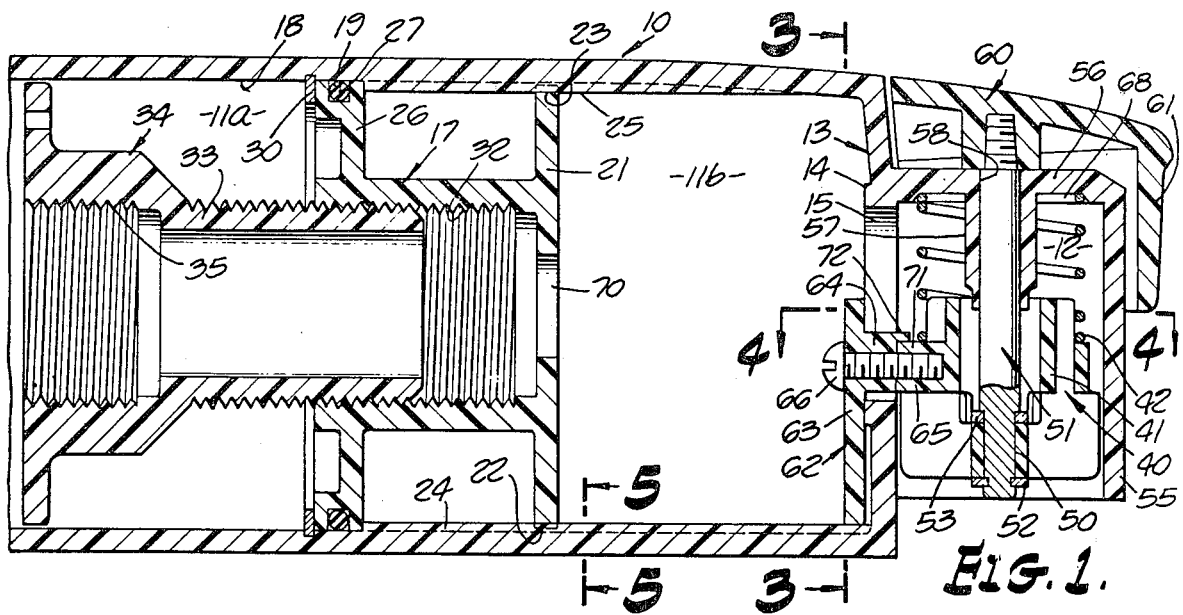
FIG. 1 is a cross sectional side elevational view of a spout assembly according to the present invention.

Turning now to the drawings, an exemplary spout assembly according to the present invention includes a body 10 molded of a suitable plastic material such as that sold under the name Cycolac EP 3510. The body 10 includes an inlet chamber 11a–11b and an outlet chamber 12, the two chambers being separated by a partition 13. The partition 13 is in the form of a wall having a flat shoulder 14 and an aperture 15 through the wall.

Figure 5:
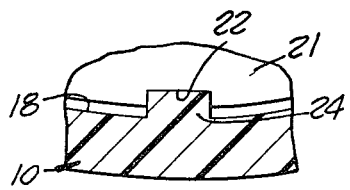
FIG. 5 is a cross sectional view taken along a line 5—5 of FIG. 1.

Another partition member 17, generally termed a "back door" in the art, separates the inlet chamber into the chambers 11a and 11b. The member 17 may be formed of plastic, such as that sold under the name Celcon, and is sealed with the interior wall 18 of the body 10 by means of an O-ring 19. A forward flange 21 of the member 17 has lower and upper slots 22-23 cooperating with respective ribs 24 and 25 on the inside wall 18 of the spout body 10 to key the member to the body to keep the member from rotating, in the manner illustrated for the slot 22 and rib 24 in FIG. 5. A circular rear flange 26 includes an annular groove 27 within which the O-ring 19 is disposed and abuts a circular portion of the wall 18 to form a sealed partition between the chambers 11a and 11b. The member 17 is retained in position by a retaining ring 30 which may be formed of stainless steel.

The member 17 may be internally threaded at 32 to receive a threaded portion 3 of an adapter 34. The adapter 34 has a threaded portion 35 at the rear thereof for connection of the assembly with a pipe of a plumbing system. Different adapters may be provided with different diameter threaded portions 35 to enable coupling of the spout assembly with different size pipes. The adapter 34 may be made of the same material as the member 17.

Figure 2:
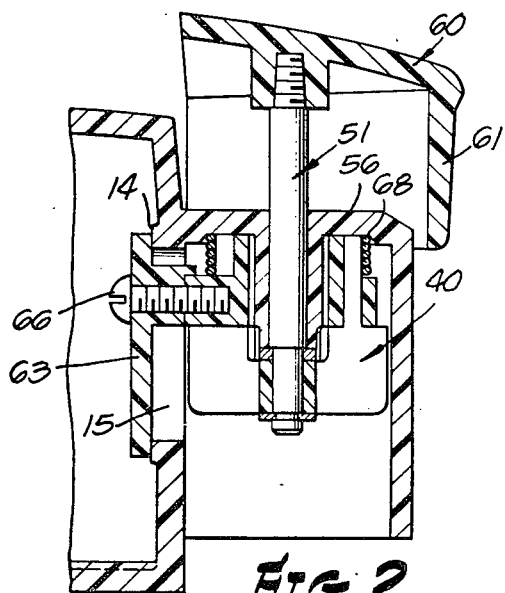
FIG. 2 is a partial cross sectional elevational view illustrating a nozzle and flapper thereof in a position to terminate flow through the assembly.
Figure 3:
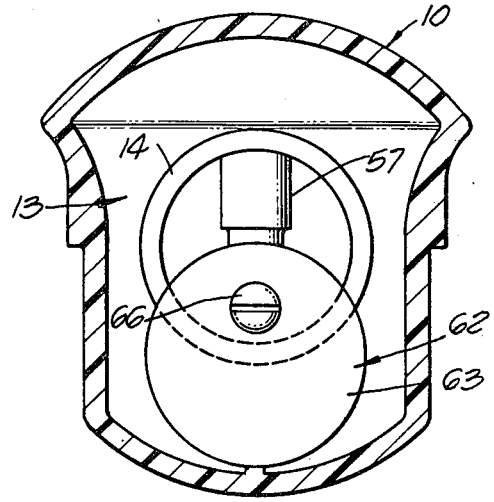
FIG. 3 is a cross sectional view taken along a line 3—3 of FIG. 1.
Figure 4:
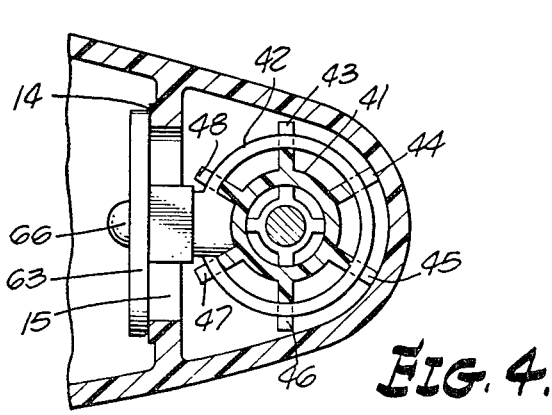
FIG. 4 is a cross sectional view taken along a line 4—4 of FIG. 1.

A nozzle 40 having a suitable arrangement of flow deflecting vanes, such as cylindrical vanes 41-42 and radial vanes 43 through 48 as best seen in FIG. 4, is disposed within the outlet chamber 12. The central portion of the nozzle 40 has an integrally formed collar 50, as best seen in FIGS. 1 and 2, to which the lower end of a stem 51 is attached by means of a stainless steel clip 52 and brass reinforcing washer 53. The chamber 12 is defined by the upstream face of the partition wall 14, arcuate portion 55 and cover portion 56 of the body 10. An integrally formed boss or bushing 57 depends downwardly from the cover 56 and has an aperture 58 therein through which the upper portion of the stem 51 extends. A lift button 60 is secured to the upper end of the stem 51, and has a skirt 61 overlapping the portion 55 of the body. The upper end of the vane 41, in combination with the underside of the cover 56, forms a stop for the nozzle when the latter is raised to the off position in FIG. 2. The nozzle 40 may be formed of the same material as the member 17, and the lift button 60 preferably is formed of the same material as the body 10.

A flapper or gate 62, which may be formed of the same material as the member 17, is disposed within the inlet chamber 11b. The flapper may be in the form of a circular plate having integrally formed therewith a proturbance 64 extending through the aperture 15. The plunger 40 has formed integrally therewith a cooperating connector portion 65 which is secured with the proturbance 64 by means of a screw fastener 66. In this manner, reciprocal movement of the plunger 40 by means of the lift button 60 raises and lowers the flapper 62. A spring 68, preferably of stainless steel, is disposed about the boss 57 and engages the underside of the cover 56 and top of annular vane 42 of the plunger to normally bias the plunger 40 downwardly to the position seen in FIG. 1. This ensures that the plunger 40 returns to the open, or on, position when the water supply is turned off. In the position shown in FIG. 1, water may flow through the adapter 34, aperture 70 and flange 21 of the member 17, through the aperture 15 in the partition 13, and past the vanes of the nozzle 40 to the exterior of the assembly. When the lift button 60, and thus the nozzle 40 and flapper 62, are raised to the position shown in FIG. 2, water flow through the aperture 15 in the partition 13 is terminated by the flapper 62 covering the aperture 15 and sealing with the annular upstream face formed by the shoulder 14 of the partition. The force of the water pressure on the upstream face of the flapper 62 both serves to seal the flapper against the partition and to maintain the flapper 62 and nozzle 40 in the upper, or off, position shown in FIG. 2.

In order to prevent the flapper 62 from rotating with respect to the connector 65 of the nozzle 40, the two may be keyed together in any suitable manner as by providing a flat surface at 71 on the connector 65 and a flat lip 72 on the proturbance 64 of the plunger 62.

Turning now to FIGS. 6 through 10, the same illustrate a spout assembly embodiment similar to that shown in FIGS. 1 through 5, but include several differences, notably an integrally formed nozzle in the body and a different biasing arrangement for the flapper. The assembly includes a spout body 74 which may be formed of the same plastic as the body 10 of FIG. 1. The body has an inlet chamber 76a–76b, an outlet chamber 77 divided by a partition 78 formed of the same material as member 17 of FIG. 1. In this case, the partition 78 is a separate cup-shaped member sealed with the interior wall 79 of the body 74 by means of an O-ring 80. The partition includes a wall 81 having an annular shoulder 82 and an aperture 83 therethrough. An integrally formed slotted guide 85 may be provided on the partition for facilitating proper movement of a stem 86. A "back door" member 88 formed of the same material as the partition 78 fits within the body 74 and mates with the partition at a V-groove 89 and seperates the inlet chamber into chambers 76a and 76b. The member 88 includes an outer cylindrical wall 90 engaging the inner wall 79 of the body 74, and annular web 91 and an inner cylindrical fitting 92. The fitting 92 is internally threaded to receive an end 93 of an adapter 94 which may be formed of the same material as the partition 78. The adapter 94, as was the case with the adapter 34 of FIG. 1, may be formed so as to receive different size supply pipes. The fitting 92 includes an upstream wall 95 having an aperture 96 therein through which water may flow from the adapter 94, through the aperture 83 in the partition 78 to the outlet chamber 77. Water then flows from the outlet chamber 77 through a nozzle 97 integrally formed as a part of the body 74. The member 88 is press-fit into the body 74 and is retained therein by means of fingers 98a–98b formed on the member 88 which engage slots 99a–99b in the body.

Figure 6:
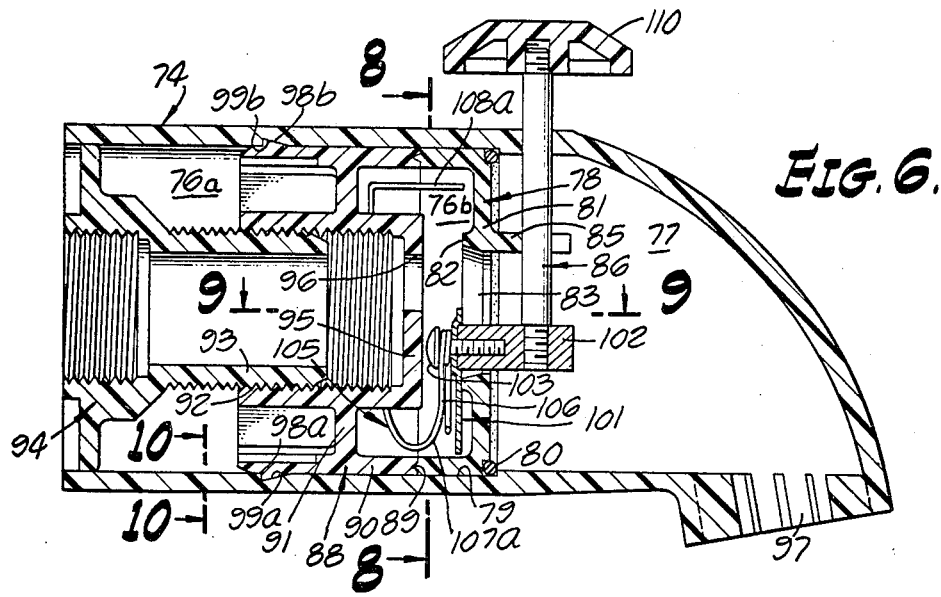
FIG. 6 is a cross sectional side elevational view of a modified spout assembly according to the present invention.
Figure 8:
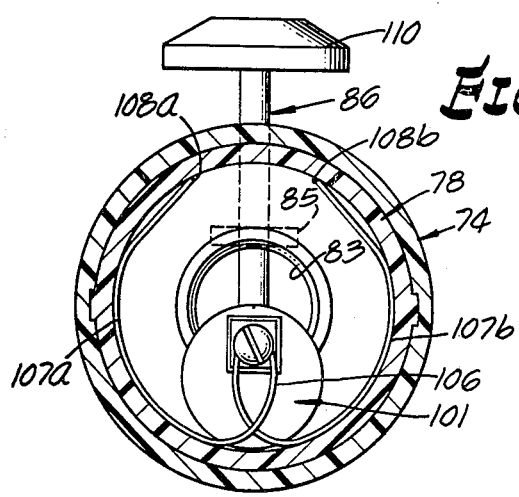
FIG. 8 is a cross sectional view taken along a line 8—8 of FIG. 6.
Figure 7:
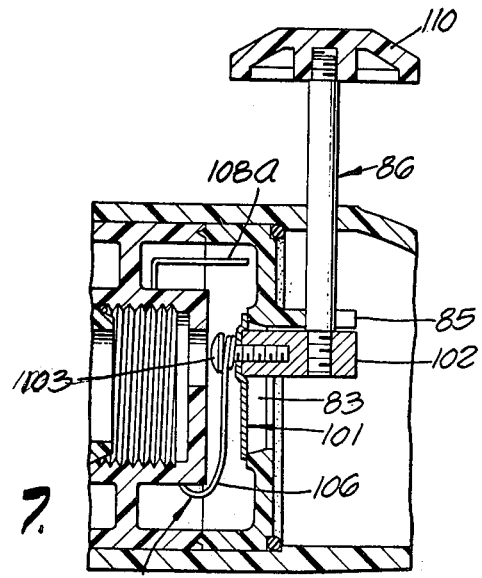
FIG. 7 is a partial cross sectional elevational view illustrating a flapper of the assembly in a position to terminate flow through the assembly.
Figure 9:
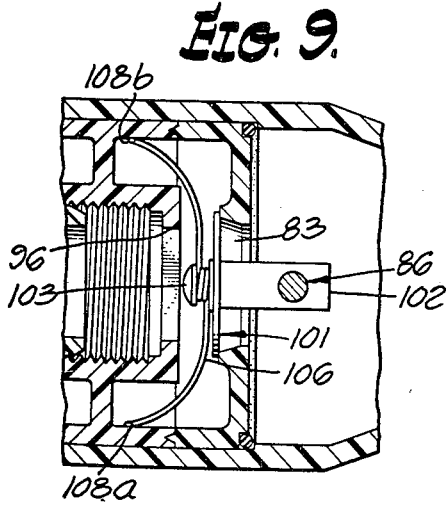
FIG. 9 is a cross sectional view taken along a line 9—9 of FIG. 6.
Figure 10:
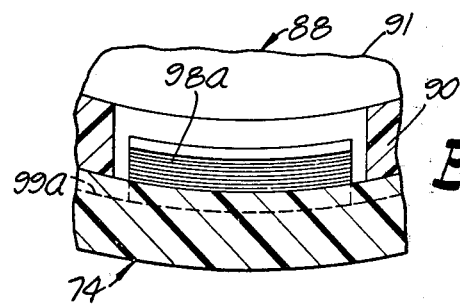
FIG. 10 is a cross sectional view taken along a line 10—10 of FIG. 6.

A flapper 101 is provided, which may be formed of brass as shown, or may be formed of a suitable plastic material. The flapper is in the form of a circular disc as best seen in FIG. 8, and is coupled with the lower end of the stem 86 by means of a connector 102 and a screw fastener 103. The connector 102 extends through the aperture 83 in the partition 78. An arcuate spring 105, preferably formed of sainless steel wire, has a loop portion 106 as seen in FIGS. 6 and 8 secured to the flapper 101 by the screw fastener 103. The loop portion 106 extends downwardly and then rearwardly into loop portions 107a–107b thereby forming a compound loop, and terminates in respective forwardly-extending legs 108a and 108b. The spring compound loop and legs abut the inner surface of chamber 76b formed by the inner surface of the cup portion of the partition 78 and the inner surface of the wall 91 of the member 88. This arrangement biases the flapper 101, and stem 86 and a lift button 110 coupled to the upper end of the stem 86, downwardly to the position shown in FIG. 6. This spring may be desired, depending upon the precise configuration and placement, bias the flapper 101 toward the upstream face 82 of the partition 78, although sufficient sealing biasing force of the flapper against the shoulder is provided by water pressure when the flapper is in the upper, or off, position as shown in FIG. 7.

The present embodiments of this invention are to be considered in all respects as illustrative and not restrictive, and scope of the invention being indicated by the appended claims rather than by the foregoing description, and all changes which come within the meaning and range of equivalency of the claims therefore are intended to be embraced therein.

What is claimed is:

1. A diverter spout assembly comprising plastic body means including an inlet fluid chamber and an outlet fluid chamber separated by an intermediate partition means having an aperture therein through which fluid mays flow from said inlet chamber to said outlet chamber and having an upstream face, reciprocal means including a plunger with a plurality of fluid directing vanes forming a nozzle mounted for movement in said outlet chamber, and plastic flapper means disposed in said inlet chamber for selectively enabling blocking of said aperture in said partition means, said flapper means including a body portion within said inlet chamber and disposed to cooperate with the upstream face of said partition means at said aperture therein, and including a connector extending through said aperture and secured to said reciprocal means for enabling selective positioning of said flapper means by said reciprocal means for either allowing fluid to flow through said aperture to said outlet chamber or for blocking fluid flow through said aperture.

2. An assembly as in claim 1 wherein said plunger is formed of plastic, and lift button means exterior to said body means coupled with said plunger means by a stem extending through a portion of said body means defining said outlet chamber for enabling reciprocal movement of said plunger means in said outlet chamber.

3. An assembly as in claim 1, including spring means coupled with said reciprocal means for biasing said plunger and said flapper means to an on position.

4. An assembly as in claim 1 including connector means disposed within said body means, said connector means being formed of plastic and having an opening therein communicating with said aperture in said partition means, said connector means being rigidly secured and keyed within said body means.

5. A diverter spout assembly comprising body means including an inlet fluid chamber and an outlet fluid chamber separated by an intermediate partition means having an aperture therein through which fluid may flow from said inlet chamber to said outlet chamber and having an upstream face, reciprocal means including a plunger with a plurality of fluid directing vanes forming a nozzle mounted for movement in said outlet chamber, and flapper means disposed in said inlet chamber for selectively enabling blocking of said aperture in said partition means, said flapper means including a body portion within said inlet chamber and disposed to cooperate with the upstream face of said partition means at said aperture therein, and including a connector extending through said aperture and secured to said reciprocal means for enabling selective positioning of said flapper means by said reciprocal means for either allowing fluid to flow through said aperture to said outlet chamber or for blocking fluid flow through said aperture.

* * * * *